United States Patent [19]
Damico et al.

[11] 3,878,305

[45] Apr. 15, 1975

[54] FORTIFICATION OF FOODSTUFFS WITH N-ACYL DERIVATIVES OF SULPHUR-CONTAINING L-AMINO ACIDS

[75] Inventors: Ralph Anthony Damico; Robert Wayne Boggs, both of Cincinnati, Ohio

[73] Assignee: The Procter & Gamble Company, Cincinnati, Ohio

[22] Filed: May 25, 1972

[21] Appl. No.: 256,860

[52] U.S. Cl. .............. 426/104; 426/190; 426/199; 426/204; 426/205; 426/208; 426/212; 426/342
[51] Int. Cl. .......................... A23l 1/30; A23l 1/00
[58] Field of Search ......... 99/14, 17, 18; 260/534 S; 99/1 G, 2 G; 426/104, 190, 204, 205, 208, 209, 210, 212, 342, 199

[56] References Cited
UNITED STATES PATENTS 2,850,387  9/1958  Town ...................................... 99/14
2,865,928  12/1958  Fields et al. ......................... 99/14 X

OTHER PUBLICATIONS

Abstract of Netherlands Patent 7,207,189 (May 12, 1972).

Jackson et al. (I), Proc. Soc. Exptl. Biol. Med., Vol. 30, 587–588 (1933).

Jackson et al. (II), J. Biol. Chem., Vol. 122, pages 425–432 (1938).

*Primary Examiner*—James R. Hoffman
*Attorney, Agent, or Firm*—John B. Goodman; Jack D. Schaeffer; Richard C. Witte

[57] ABSTRACT

A method of fortifying certain proteinaceous foodstuffs which are characterized by a nutritionally limiting content of sulphur-containing amino acids with selected N-acyl derivatives of the L stereoisomeric form of such sulphur-containing amino acids; and products so fortified.

11 Claims, No Drawings

FORTIFICATION OF FOODSTUFFS WITH N-ACYL DERIVATIVES OF SULPHUR-CONTAINING L-AMINO ACIDS

BACKGROUND OF THE INVENTION

This invention relates to the fortification of proteinaceous foodstuffs, which are deficient in sulphur-containing amino acids, with tasteless, stable, yet nutritionally available derivatives of those amino acids. The term 'proteinaceous foodstuff' is meant to encompass protein per se, whether derived from vegetable or animal sources, and additionally, to manufactured products intended for human or animal consumption containing such proteins as a significant component.

There is considerable impetus to satisfy the protein requirement in the diet of man with protein derived exclusively from vegetable sources. There are essentially two reasons which compel human populations to look to vegetable proteins for a substantial, if not an exclusive, source of dietary protein. The paramount reason is one of efficiency. That is, at least in certain parts of the world, it is no longer feasible, from the standpoint of consumption of energy, to grow a crop, to feed livestock, to obtain required dietary protein. The second reason is best couched in terms of nutrition and health. Manufactured foodstuffs based on vegetable proteins afford the possibility of ultimately achieving a perfect balance of nutrients with controlled exclusion of certain identified detrimental agents, such as cholesterol. And, there are subsidiary reasons involving the factor of convenience, and, to some, reasons of personal conviction.

There appears to be no question as to the capacity to obtain vegetable proteins in sufficient quantity. Success in the agriculture of, for example, the legumes (and in particular the soybean) have assured the ready procurement of vegetable protein in quantity. And this assurance of quantity is, in part, attributable to the development of associated technologies to exploit and make available this source of native vegetable protein. The principal concern is one of quality of that vegetable protein. If the vegetable protein is not nutritionally the equivalent of protein derived from animal sources, that is, of comparable quality, the fact that the vegetable protein is obtainable in quantity is of lessened significance. The fact is that proteins derived from a chosen plant species source are not of comparable nutritional quality to animal sources. This is evident, in part, by examination of the amino acid content, or profile, of a chosen plant protein. For example, wheat gluten is deficient in lysine; soybean protein is deficient in the sulphur-containing amino acids, such as methionine. Nutritionists have applied the term "limiting" to such amino acids, and have noticed that a protein characterized by a particular limiting essential amino acid is effectively levelled in nutritive value to the content of the first limiting amino acid. For example, if a certain vegetable protein was relied upon for the sole source of dietary protein, and if that protein was characterized by an amino acid profile revealing certain limiting amino acids, it would be necessary to consume in the diet an excessive amount of that protein in order to insure the nutritionally required intake of those limiting essential amino acids. Besides the sheer economic waste of such a diet, there is increasing evidence in the scientific literature that excess dietary protein may have detrimental physiological effects.

Fortification of proteinaceous foodstuffs with sulphur-containing amino acids, and particularly with respect to methionine, has typically involved direct addition of DL-methionine as the free acid. The DL racemic mixture was employed even though only the L stereoisomeric form is found incorporated in human protein because methionine is one of the few α-amino acids in which the D form experiences the metabolic conversion to the L form. That is, it is well-recognized that D and L methionine are approximately nutritionally equivalent. However, all attempts to fortify methionine deficient foodstuffs with free DL-methionine proved unfeasible because of a severely intractable flavor problem. It was discovered that foodstuffs so fortified with DL-methionine developed off-flavors and became discolored. This effect was particularly noticeable for foodstuffs that were either heated prior to eating, or were stored for an indefinite period in a hydrated condition, but the effect was also noticed after dry storage. The chemical basis for the generation of these off-flavors and unsightly discolorations was, in part, attributable to the well-known Strecker degradation -- or more commonly, the Maillard reaction (chemical browning). The Maillard reaction comprises a set of reactions between amino containing compounds (here free α-amino acids) and carbonyl-containing compounds (for example, reducing sugars present in great abundance in the fortified foodstuff). The Maillard reaction is particularly distressing when sulphur-containing amino acids are involved because of the generation and liberation of noxious mercaptans and sulfides, e.g., methional is freely formed in foodstuffs fortified with methionine. Also, distinct from the Maillard reaction, degradative reactions, such as air oxidation of these sulphur-containing amino acids, adversely affect flavor. Needless to say, alternate means were sought to alleviate the sulphur amino acid deficiencies in vegetable derived proteins.

One means, of limited practical utility, involved blending proteins from different vegetable sources such that a particular amino acid deficiency of one protein was substantially cured by blending with it a precise amount of a distinct protein having that particular amino acid present in relative excess. By careful selection and precise blending, it is possible to achieve a reciprocal complementing effect. For example, sesame seed protein is rich in methionine but poor in lysine; soybean protein is poor in methionine but rich in lysine; consequently a precise blending of the two yields a more nutritionally balanced vegetable protein.

Other means available from the prior art are designed to defeat the Maillard reaction in the face of free addition of selected amino acids. Representative diverse means suggested by the prior art are: (1) encapsulation of the free amino acid; (2) simultaneous incorporation of certain alleged anti-browning agents, e.g., pyrocarbonic acid esters, and O-carboxy anhydrides of α-anhydroxy acids (U.S. Pat. No. 3,337,348 granted Aug. 22, 1967); and (3) utilization of the plastein reaction. This last mentioned means involves the bonding of the added amino acid by peptide linkage to protein molecules which constitute the bulk of the proteinaceous component of the foodstuff. All of the above-listed means are of limited practical utility. Consequently, the prior art continued the search for means in circumvention of the Maillard reaction. Among these means were suggested the utilization of tasteless derivatives of certain amino acids which were relatively inert to degradation yet nutritionally available on ingestion.

Some modicum of success was achieved on derivatization of certain of the non-sulphur-containing amino acids, but for the sulphur-containing amino acids, especially methionine, all attempts at derivatization to obtain inert, tasteless, yet nutritionally available supplements proved fruitless. In fact the prior art consensus is, as of this date, to the effect that supplementation of proteinaceous foodstuffs with methionine is not feasible in view of the generation of off-flavors, mephitic vapors, and the impartation of discoloration to foodstuffs so fortified. For example, N-acetyl DL-methionine has been suggested as a potential methionine source (the DL racemic mixture of this derivative is specified because of the art-recognized equivalence of the D and L stereoisomeric forms with respect to nutritional availability). However, this means of methionine fortification was also found unfeasible because at the level of addition of the derivative necessary for optimum nutritional results, the adverse effects of air oxidation, and, to some extent, of the Maillard reaction, were observed. That is, N-acetyl methionine is not totally inert to degradation in the Maillard reaction, and at optimum use levels required for fortification of methionine deficient vegetable proteins, the inherent weakness of the protective capacity of the N-acetyl substituent was overcome to a sensible extent (off-flavor detection threshold was exceeded), and N-acylation does not diminish the lability of these sulphur-containing amino acids to air oxidation. However, the utilization of tasteless, stable, nutritionally available amino acid derivatives does appear to offer the most potentially feasible route to benefiting vegetable proteins in order to achieve a quality thereof comparable to animal dietary protein sources.

Accordingly, an object of the present invention is to provide products fortified with tasteless, stable, nutritionally available sulphur-containing amino acid derivatives.

With this background of the invention to provide needed perspective, the unexpected results of the present invention can most readily be perceived.

SUMMARY OF THE INVENTION

Unexpectedly and contrary to the express and controlling view in the prior art, it has been discovered that of the racemic mixture, N-acyl DL-methionine, only the L-isomer is nutritionally available; the D isomer does not serve as a source of methionine in animal metabolism. Unexpectedly, therefore, it has been discovered that fortification of proteinaceous foodstuffs, which are deficient in sulphur-containing amino acids, can be feasibly achieved with N-acyl derivatives of such amino acids, provided these derivatives are substantially free of the D-isomer.

Accordingly, in its composition aspect, the present invention is a proteinaceous foodstuff comprising a sulphur-containing amino acid deficient protein and a nutritionally supplemental amount of an L-amino acid derivative selected from the group consisting of N-acyl L-methionine, N,N'-diacyl L-cystine, and N-acyl L-cysteine; said foodstuffs being essentially free of the corresponding D-isomer of said amino acid derivatives.

The present invention further provides a means of fortifying foodstuffs with sulphur-containing amino acids comprising adding to said foodstuffs a nutritionally effective amount of an amino acid derivative selected from the group consisting of N-acyl L-methionine, N,N'-diacyl L-cystine, and N-acyl L-cysteine.

DETAILED DESCRIPTION OF THE INVENTION

A detailed description of the invention is conveniently presented by discussion of three interrelated topics: (A) Identification and preparation of the preferred sulphur-containing amino acid derivatives; (B) Class of proteinaceous foodstuffs affected by this invention; and (C) Meaning of nutritionally effective amino acid fortification.

A. Identification and Preparation of the Derivatives

As an experimental procedure for evaluating the palatability of foodstuffs fortified in accordance with this invention, a test method was developed to simulate the reaction conditions likely to be encountered by a foodstuff susceptible to degradation in the Maillard reaction. Basically the test method involves the reaction between a reactive carbonyl compound, such as diacetyl, $CH_3(CO)_2CH_3$, and the amino acid (or derivative) of interest. The model reactive carbonyl compound, diacetyl, is analogous to the reducing sugars of real food systems in reaction with amino acids.

The test method clearly reveals stability of derivatives of methionine, cystine and cysteine relative to the free acids in the food environment: To 100 ml. volumes of a 80:20 diglyme/water solution containing 0.86 grams diacetyl was added either 1.49 grams of methionine or 2.40 grams of cystine. Upon heating these solutions to a temperature of about 80°C for about thirty minutes, it was observed that the solutions turned dark brown and evolved strongly offensive odors characteristic of sulfides and mercaptans. Similar results are obtained when cysteine is subjected to this test. But when the N-acyl derivatives (N-acetyl methionine and N,N'-diacetyl cystine) were substituted for the corresponding free acid at comparable molar concentrations in the foregoing test procedure, the solutions were observed to remain colorless and no odors were detected. Similar results are obtained when N-acetyl cysteine is subjected to this test. In this manner candidate amino acid derivatives were screened for stability against the Maillard reaction. It was thereby determined that N-acyl derivatives of cystine, cysteine, and methionine were suitable derivatives for practice of the invention herein set forth.

An unexpected discovery was that of these N-acyl derivatives only the L-stereoisomeric form was nutritionally available. Proof that these N-acylated sulphur-containing L-amino acids are nutritionally available to the animal organism, and proof that the corresponding D-isomers are not nutritionally available was obtained by conventional feeding studies on white rats. Table I clearly demonstrates this discovery.

TABLE I

Utilization of D and L Isomers of N-acetyl-methionine in Growing Rats

| 10% Protein Diet Consisting of: | Two week Wt. Gain (grams) | Total Protein Consumed (grams) | Ratio Wt. Gain to Protein Consumed |
|---|---|---|---|
| Isolated Soybean Protein | 26.6 | 32.1 | 0.83 |

TABLE I-Continued

Utilization of D and L Isomers of N-acetyl-methionine in Growing Rats

| 10% Protein Diet Consisting of: | Two week Wt. Gain (grams) | Total Protein Consumed (grams) | Ratio Wt. Gain to Protein Consumed |
|---|---|---|---|
| +0.4% DL methionine | 64.0 | 38.2 | 1.66 |
| +0.4% L methionine | 64.8 | 37.5 | 1.76 |
| +0.4% D methionine | 53.9 | 35.0 | 1.56 |
| +0.52% acetyl-DL-methionine | 54.3 | 32.6 | 1.67 |
| +0.52% acetyl L-methionine | 62.7 | 34.1 | 1.84 |
| +0.52% acetyl D-methionine | 23.9 | 30.0 | 0.81 |

The first fact to be obtained from the data of Table I is that D and L methionine are nutritionally available to an equivalent extent (within experimental error). The second fact to be obtained is that N-acetyl-L-methionine is nutritionally the equivalent of the free acid DL mixture. The third fact to be obtained from Table I is that, on comparing the unfortified control with the diet fortified with N-acetyl D-methionine, N-acetyl D-methionine is not nutritionally available. These results were confirmed by a complementary study involving well-known radiochemical techniques.

It is known that rats readily metabolize acetate, and the rate and extent of metabolism can be monitored by collecting the expired $CO_2$ derived from the acetate. Accordingly, separate groups of rats were force fed equivalent amounts of either $^{14}C$ labelled sodium acetate or $^{14}C$ acetyl labelled N-acetyl L-methionine. The rate of appearance of $^{14}C$ label in the expired $CO_2$ and the cumulative label collected were the same for both sets of animals. This confirmed the thesis that N-acetyl L-methionine is rapidly hydrolyzed to acetate and L-methionine, and proved that the acetyl moiety is metabolized as acetate. The same result was obtained when the respective $^{14}C$ labelled compounds were delivered to the animal by intraperitoneal injection. However, when the same experiment was repeated using $^{14}C$ labelled N-acetyl D-methione, the label was substantially quantitatively recovered in the urine and feces with only small amounts recoverable from the expired $CO_2$; thus confirming that the N-acylated D-isomers are not nutritionally available.

Additional feeding studies were undertaken to determine the functional relationship between growth and concentration of methionine or its equivalent in the diet. In this study, reported in Table II, sets of rats were fed in varying amounts either L-methionine or N-acetyl L-methionine in a diet consisting of 10% soybean protein, 39% sucrose, 39% starch, 6% corn oil, 4% mineral and 1% vitamin. From the data of Table II it can be seen that L-methionine and N-acetyl L-methionine are, within experimental error, equivalent with respect to the observable of interest. A plot of the data of Table II would show weight gain rising steeply until an inflection occurs at about 3.5% methionine or its equivalent of the total protein in the diet. Thereafter the weight gain remains constant with increasing methionine until the level of methionine of the total protein in the diet reaches approximately 8.0%, where weight gain steeply decreases providing strong evidence of the toxicity of methionine in these test animals when the methionine in the diet exceeds about 8.0%.

TABLE II

Rat Weanling Feeding Study Showing Two Week Weight Gain As Function of L-methionine (M) or N-acetyl L-methionine (NALM)

| Two Week Weight Gain (gms.) | Weight % M of Total Diet Protein | Two Week Weight Gain (gms.) | Weight % NALM of Total Diet Protein |
|---|---|---|---|
| 36 | 3.0 | 35 | 3.8 |
| 40 | 3.5 | 38 | 4.5 |
| 42 | 4.0 | 42 | 5.1 |
| 42 | 4.5 | 45 | 5.8 |
| 45 | 5.0 | 45 | 6.4 |
| 43 | 5.5 | 43 | 7.0 |
| 42 | 6.0 | 39 | 7.6 |
| 35 | 8.0 | 34 | 10.2 |
| 20 | 10.0 | 22 | 12.8 |

While the above-detailed feeding studies involve N-acetyl L-methionine, similar results are obtained from feeding studies involving analogous N-acyl derivatives of methionine, as well as the N-acyl derivatives of cystine and cysteine. Accordingly, the N-acetyl derivatives of L-methionine, L-cystine, and L-cysteine (N-acetyl L-methionine, N,N'-diacetyl L-cystine, and N-acetyl L-cysteine, respectively) are the most preferred supplements, but the invention fully comprehends derivatives where the N-acyl substituent is derived from the well-known and commercially available fatty acids having from 1 to 24 carbon atoms. These derivatives are conveniently prepared by reacting the anhydride of the fatty acid taken with the sulphur-containing L-amino acid of interest. L-amino acids contaminated with less than about 5.0% of its D-isomer are readily obtainable commercially, and are entirely suitable for preparation of these N-acylated L-amino acids. A complete description of this acylation reaction is given by Birnbaum, et al., 194 *J. Biol Chem.* 455 (1952), where the conditions of reactions are such that racemization to the corresponding D-isomer does not occur to a significant extent.

B. Class of Foodstuffs

The class of foodstuffs contemplated in this invention are comprised of any food source which for reasons of nutrition requires fortification with selected α-amino acids. But the invention is primarily concerned with proteinaceous foodstuffs which are either treated to a heating step prior to consumption; held for an indefinite period in a hydrated state prior to consumption; or are held for a prolonged period in dry storage. However, the invention finds its principal application in foodstuffs which contain protein derived substantially from vegetable sources, e.g., the oil seeds and leguminous seeds, principally the soybean. Specific examples of such proteinaceous foodstuff products, where the protein component is substantially derived from vegetable sources, include: textured vegetable protein meat analogues, vegetable protein cheese analogues, beverages, nut butters, breakfast cereal products, proteinaceous snack products, pet foods -both kibbled and hydrated, and animal feeds.

In greater detail, an especially important embodiment of the invention is the fortification of certain proteinaceous source materials, such as the soybean. Ordinarily, soybean protein is available in certain fractions which are distinguished by the method of preparation. These fractions are popularly known as soybean meal, flour, concentrate and isolate. Each fraction is characterized by its protein content, which ranges from about 30% for the meal to about 90% for the isolate. Successive fractionations, or purifications, not only increase the protein content but also remove off-flavor ingredients and improve the textural properties of the protein. However, the benefication achieved by fractionation is not without detriment, for as the protein concentration is increased the nutritive quality of the protein decreases. The magnitude may be seen in relative terms: If the nutritive quality of the meal is accorded a value of 1.0, then the nutritive quality ratio of meal:flour:-concentrate:isolate is 1.0:0.81:0.74:0.61. This decrease in protein quality is due primarily to a reduction in the sulphur-containing and other essential amino acids as fractionation progresses. Soybean proteins are first limiting in the sulphur-containing amino acids, but they are also deficient in lysine, threonine, and valine. Consequently, in any scheme of fortification it is necessary to be conscious of the entire amino acid profile of a given proteinaceous material. Such information is readily available from published tables of amino acid content of diverse proteins, for example, *Amino Acid Content of Foods and Biological Data on proteins;* Food and Agricultural Organization of the United Nations, No. 24, 1970. In this manner, it is possible to nutritionally balance all amino acids to any desired or optimum level. Therefore, it is understood that this invention encompasses all proteinaceous foodstuffs which are deficient in sulphur-containing amino acids, even when that deficiency is not first limiting.

Other proteinaceous foodstuffs contemplated by this invention include, among the oil seeds: cottonseed, peanut, safflower, sesame, sunflower, rapeseed and flax meal (linseed meal); among the milk protein: casein, non-fat milk solids, lactalbumin, and whey protein; among the cereal grains: wheat (gluten), wheat, corn, barley, oats, rice, rye, wheat bran, and wheat germ; among the marine proteins: fish protein concentrate, and fish muscles soluble; among the plant proteins: leaf (e.g., alfalfa) and coconut; among the single-cell proteins: yeast, and petroleum, methane and carbohydrate feeding microbes; among the animal proteins: collagen (gelatin), keratin, muscle, serum protein, offal, wool, silk waste, meat protein concentrate, and feather meal. Also contemplated by this invention are manufactured proteinaceous foodstuffs fromulated in part from selected proteins from the above representative enumeration. In this respect it is understood that the proteinaceous source material may be fortified directly, and thereby provide a nutritionally balanced proteinaceous foodstuff useful either alone or in combination with other ingredients as a manufactured foodstuff; or fortification may be effected during formulation of the manufactured proteinaceous foodstuff.

C. Nutritionally Effective Fortification, Meaning

No absolute meaning can be attached to the term 'nutritionally effective fortification' in the abstract. As mentioned above, nutritionally effective, or optimum, fortificaton is critically dependent on the precise amino acid constitution of the particular protein, and it is well within the routine of one skilled in the art to develop a scheme of fortification given the identity of the protein and its particular amino acid deficiencies. With respect to proteins deficient in the sulphur-containing amino acids, the practice of this invention will typically require from as little as 0.1 up to 10.0 weight per cent addition of methionine equivalents based on the total protein content of the foodstuff.

A conventional means of specifying the ranges of fortification contemplated in this invention is to make these ranges relative to the total suplur-amino acid content of whole egg protein, which is considered optimum and ranges from approximately 5.4 to 7.2 weight per cent of the total protein in the egg. In fact, the individual amino acids in whole egg protein are in such quantity and proportion that they comprise an ideal pattern for high quality protein. The content of a specific amino acid in this protein is exceptionally uniform when expressed as percent of the protein. It is therefore reasonable to conclude that the unit for safe addition of an amino acid to a food should be the difference between the amount of that amino acid present in whole egg protein (expressed as the percent of the total protein) and the amount present in the protein to which the amino acid is being added.

However, in specifying levels of addition in an amino acid fortification scheme involving addition of acetyl derivatives of L-methionine, L-cystine and L-cysteine, it is important to take notice of certain metabolic relations, namely: 1) Methionine can fully replace the nutritional requirement for cystine and cysteine according to the following overall stoichiometry: one mole methionine → one mole cysteine, and two moles methionine → one mole cystine. 2) Cystine and cysteine are metabolically interconvertible according to the following stoichiometry: one mole cystine ⇌ two moles cysteine. 3) Although documented for certain microbial beings, the reverse relationship, cysteine or cystine going to form methionine, is not thought to be a significant metabolic pathway in the higher animal organisms.

Also, it should be noted that of the sulphur-containing amino acids in whole egg protein about 60% is represented as methionine and 40% is represented as cystine and cysteine collectively. Accordingly, the above-given range of 5.4 – 7.2 wt. per cent, for the sulphur-containing amino acid component of whole egg protein should be adjusted to 3.2 – 7.2 by multiplying the lower limit by 0.60 in order to give a more realistic range relative to methionine content. And, relative to total cystine and cysteine, the range units should be reduced 40%; thus, 2.2 – 2.9% is a more useful range when the object is fortification with cystine and cysteine derivatives.

Therefore, in accordance with this invention, when it is desired to fortify a foodstuff with an N-acylated derivative of L-methionine, the adjusted range, 3.2 –7.2, is useful in determining the level of fortification required to benefit the chosen footstuff to the quality of whole egg protein in sulphur-containing amino acids. For example, if a given proteinaceous foodstuff of interest was found to contain 2.0 weight per cent sulphur amino acids (arbitrarily taken as methionine equivalents) of the total protein, the preferred method of this invention calls for the addition of 191/149 [3.2-2.0 to 7.2-2.0] = 1.5 to 6.7 grams of N-acetyl L-methionine per 100 grams protein in order to bring the total sulphur amino acid content of the proteinaceous foodstuff up to the level of egg. That is, the difference between the actual weight percentage of sulphur amino acids (assumed equivalent to methionine) and the optimum weight percentage found in egg (also assumed equivalent to methionine) is multiplied by the molecular weight ratio of the particular N-acyl L-methionine derivative used in fortification to methionine. If an N-acyl derivative of L-cystine or L-cysteine is used in fortification, the optimum range of addition is found by multiplying the range [2.2–X to 2.9–X] (where X, based on the total protein of the particular footstuff, is the sulphurcontaining amino acid percentage component equivalent to either cystine or cysteine, respectively) by the molecular weight ratio of the particular N-acyl derivative of either L-cystine or L-cysteine, respectively, to cystine or cysteine, respectively. This method of calculating the range to be added is of course approximate, but given the extreme variability of foodstuffs, this method of calculation provides standard rule and nomenclature upon which comparison of diverse footstuffs may be made.

The actual method of incorporation of the amino acid derivatives encompassed by this invention to obtain the fortified proteinaceous foodstuff, is of course controlled by the nature of the particular foodstuff. For materials such as soybean flour, the derivatives may be added as dry powders; for nonhomogeneous materials such as animal feed formulations, the derivatives may be incorporated by spraying from solution; for manufactured proteinaceous foodstuffs such as nut butters, the derivatives may be incorporated as any minor ingredient, or enter the formulation dispersed in a suitable vehicle, such as oil. These matters are well within the routine consideration of one skilled in the art.

The following examples of proteinaceous foodstuffs fortified with N-acyl derivatives of L-methionine, L-cystine and L-cysteine are given to indicate the range of products contemplated in the instant invention. It is of course to be understood that these examples are by way of illustration only, and in no way are to be considered as limiting the scope of the invention.

Each of the foregoing proteinaceous foodstuffs is substantially improved in nutritive value by reason of the addition of the specified amino acid derivatives, provided the addition corrects a first-limiting deficiency. This will always be the case -- either inherently, as with soybean protein, or by result of a complete fortification scheme which previously corrected first limiting conditions of amino acids other than the sulphurcontaining. Moreover, this improvement is achieved without adversely affecting flavor and odor, or without the production of potentially toxic degradation products.

The per cent addition figures in the above example are calculated so as to benefit the indicated protein in sulphur amino acids to a level comparable to that of whole egg protein. In the example, equivalent beneficiation is achieved when the N-acetyl L-methionine, N,N'-diacetyl L-cystine, and N-acetyl L-cysteine, respectively, is replaced by a nutritionally equivalent amount of the corresponding derivatives having as acyl substituent: formyl, propionoyl, butyroyl, valeroyl, caproyl, enanthoyl, caprylyl, pelargonoyl, capryl, undecanoyl, lauroyl, tridecanoyl, myristoyl, pentadecanoyl, palmitoyl, margaroyl, stearoyl, nonadecanoyl, arachidoyl, heneicosanoyl, behenoyl, tricosanoyl, tetracosanoyl, palmitoleoyl, oleoyl, elaidoyl, vaccenoyl, linoleoyl, linolenoyl, γ-linolenoyl, eleostearoyl, arachidonoyl, and clupanodonoyl, respectively.

The following examples are illustrative of products based on proteinaceous foodstuffs supplemented in accordance with the invention.

EXAMPLE II

A meat analog product was made according to the following formulation and procedure.

EXAMPLE I

Fortification of Certain Diverse Protein Source Materials with N-acetyl L-methionine, N,N'-diacetyl L-cystine, and N-acetyl L-cysteine % Addition of Total Protein

| Protein Sources | N-acetyl L-Methionine | | N,N'-diacetyl L-cystine | | -acetyl L-cysteine | |
|---|---|---|---|---|---|---|
| | a | b | c | d | e | f |
| Animal Protein | | | | | | |
| Collagen (Gelatin) | 3.8 | 9.0 | 2.8 | 3.8 | 2.8 | 3.8 |
| Plant Protein | | | | | | |
| Leaf (Alfalfa) | 0.8 | 5.9 | 0.8 | 1.8 | 0.8 | 1.8 |
| Oilseeds | | | | | | |
| Soybean | | | | | | |
| Meal | 1.2 | 6.3 | 1.4 | 2.3 | 1.4 | 2.3 |
| Concentrate | 1.3 | 6.4 | 1.5 | 2.4 | 1.5 | 2.4 |
| Isolate | 1.5 | 6.7 | 1.6 | 2.6 | 1.6 | 2.6 |
| Cottonseed | 0.3 | 5.4 | 0.8 | 1.8 | 0.8 | 1.8 |
| Peanut | 1.3 | 6.4 | 1.1 | 2.0 | 1.1 | 2.0 |
| Sunflower | 3.0 | 4.7 | 0.8 | 1.8 | 0.8 | 1.8 |
| Flax Meal (Linseed Meal) | 0.1 | 5.2 | 0.9 | 1.9 | 0.9 | 1.9 |
| Cereal Grains | | | | | | |
| Wheat (Gluten) | 2.0 | 4.6 | 0.3 | 1.2 | 0.3 | 1.2 |
| Wheat | 2.0 | 3.5 | — | — | — | — |
| Corn | 3.0 | 4.9 | 0.8 | 1.8 | 0.8 | 1.8 |
| Barley | 2.0 | 4.2 | 0.4 | 0.7 | 0.4 | 0.7 |
| Oats | 0.6 | 5.8 | 1.4 | 2.3 | 1.4 | 2.3 |
| Rice | 0.4 | 5.5 | 1.5 | 2.4 | 1.5 | |
| Milk Protein | | | | | | |
| Casein | 2.0 | 4.5 | 2.4 | 3.4 | 2.4 | 3.4 |
| Non-fat milk solids | 3.0 | 5.0 | 1.8 | 2.7 | 1.8 | 2.7 |
| Whey protein | 2.0 | 4.0 | — | — | — | — |
| Lactalbumin | 2.0 | 4.6 | 0.1 | 0.3 | 0.1 | 0.3 |
| Marine Protein | | | | | | |
| Fish Protein Conc. | 1.0 | 3.8 | 0.1 | 1.1 | 0.1 | 1.1 |

| Component | Parts by Weight |
| --- | --- |
| Soybean Concentrate (70% Protein) | 60.0 |
| Water | 40.0 |
| N-acetyl-L-mentionine | 1.8 |
| Fat | 10.0 |
| Starch | 10.0 |
| Beef Extract Flavoring | 5.0 |
| Food Coloring and Salt | — |

The components were blended to form a dough, which was passed through a three-fourth inch Brabender extruder using a temperature in the extruder of 150°C. A pressure of approximately 450 psi developed within the extruder and forced a cylindrical product from the 4 mm. exit die. The extruded product was dried and ground to particle sizes having an average diameter of one-fourth inch. When the product was hydrated and shaped into hamburger-like patties and fried in an oiled pan, no off-flavors attributable to the degradation of products of methionine were observed.

Where in Example II, the N-acetyl L-methionine is replaced by a nutritionally equivalent amount of either: N-formyl L-methionine, N-propionoyl L-methionine, N-stearoyl L-methionine, N-palmitoyl L-methionine, N-linolenoyl L-methionine, N,N'-dilauroyl L-cystine, N,N'-dipalmitoyl L-cystine, N,N'-dioleoyl L-cystine, N-linolenoyl L-cysteine, N-enanthoyl L-cysteine, N-propionoyl L-cysteine, respectively, no off-flavors attributable to degradation of products of the derivatives are perceived.

EXAMPLE III

A fortified peanut butter composition was made by adding 0.5 parts by weight N-acetyl L-methionine to a commercial peanut butter of the following composition:

| Component | Parts by Weight |
| --- | --- |
| Peanut paste | 90.0 |
| Salt | 1.2 |
| Sucrose | 5.8 |
| Molasses | 0.5 |
| Soybean monoglycerides | 0.7 |
| Rapeseed oil (iodine value 2) | 0.56 |
| Soybean oil (iodine value 2) | 0.84 |
| Soybean oil (iodine value 107) | 0.40 |

A sample of this fortified peanut butter was heated in a water bath at 95°C for 2 ½hours. No off-flavors or odors were detected. However, when an otherwise identical peanut butter was formulated with 0.4 parts by weight DL-methionine, strong odors and off-flavors were apparent after 2 hours of heating in a water bath at 95°C.

When in Example III the peanut paste is replaced by an equivalent amount of a bland soybean paste (hulled, deflavored comminuted whole beans), equivalent results are obtained with respect to flavor on fortification with N-acetyl L-methionine.

When in Example III the N-acetyl L-methionine is replaced by an equivalent amount of either: N-formyl L-methionine, N-propionoyl L-methionine, N-stearoyl L-methionine, N-palmitoyl L-methionine, N-linolenoyl L-methionine, N,N'-dilauroyl L-cystine, N,N'-dipalmitoyl L-cystine, N,N'-dioleoyl L-cystine, N-linolenoyl L-cysteine, N-enanthoyl L-cysteine, N-propionoyl L-cysteine, respectively, no off flavors attributable to degradation of products of the derivatives are perceived.

EXAMPLE IV

A canned pet food product embodied by the present invention is prepared by mixing and sealing the following in cans:

| Component | Parts by Weight |
| --- | --- |
| Water | 56 |
| Wheat flour | 5 |
| Soybean concentrate | 25 |
| N-Acetyl L-Methionine | 0.7 |
| Collagen | 2 |
| Iodized salt | 0.3 |
| Beef extract flavor | 2 |
| Corn meal | 10 |
| Fat | 10 |

The canned product is autoclaved at 150°C for 30 minutes, and on opening no evidence of methionine degradation is perceived.

EXAMPLE V

A complete cattle feed composition embodied by the present invention is prepared by grinding and mixing the following:

| Component | Parts by Weight |
| --- | --- |
| Timothy hay | 960 |
| Dehydrated alfalfa | 40 |
| Yellow corn | 600 |
| Corn starch | 300 |
| Iodized salt | 10 |
| Bone meal | 20 |
| Soybean meal | 30 |
| N-Acetyl-l-Methionine | 0.6 |
| Biuret | 28 |

This composition is fed to 400 pound steers at the rate of approximately 12 pounds per day. Animals placed on this diet experience optimum growth rates and the feed is characterized by the absence of potentially toxic degradation products of the methionine supplement.

What is claimed is:

1. A proteinaceous foodstuff comprising an edible sulfur-containing amino acid deficient protein and a nutritionally supplemental amount of N-acyl L-methionine, wherein the N-acyl substituent is derived from fatty acids having from 2 to 9 carbon atoms; said foodstuff being essentially free of N-acyl D-methionine.

2. The foodstuff of claim 1 where the N-acyl substituent is derived from fatty acids having from 2 to 4 carbon atoms.

3. The foodstuff of claim 2 where said foodstuff is derived from a member selected from the group consisting of: microbial cells, oil seeds, cereal grains, and plant vegetation.

4. The product of claim 3 where the N-acyl L-methionine is N-acetyl L-methionine.

5. The foodstuff of claim 2 wherein the foodstuff is selected from the group consisting of: texturized vegetable protein meat analogues, vegetable protein derived cheese analogues, beverages, nut butters, breakfast-like cereal formulations, and convenient proteinaceous snack foods.

6. The product of claim 5 where the N-acyl L-methionine is N-acetyl L-methionine.

7. The foodstuff of claim 2 where the protein is derived from soybean.

8. The foodstuff of claim 1 wherein the N-acyl L-methionine is N-propyl L-methionine.

9. A method of fortifying protein foodstuffs with sulfur-containing amino acids comprising adding to said foodstuffs a nutritionally effective amount of N-acyl L-methionine, wherein the N-acyl substituent is derived from fatty acids having from 2 to 9 carbon atoms; the N-acyl L-methionine being essentially free of the corresponding D-isomers.

10. The method of claim 9 wherein the N-acyl substituent is derived from fatty acids having from 2 to 4 carbon atoms.

11. The method of claim 9 wherein said N-acyl L-methionine is N-acetyl L-methionine.

* * * * *